UNITED STATES PATENT OFFICE.

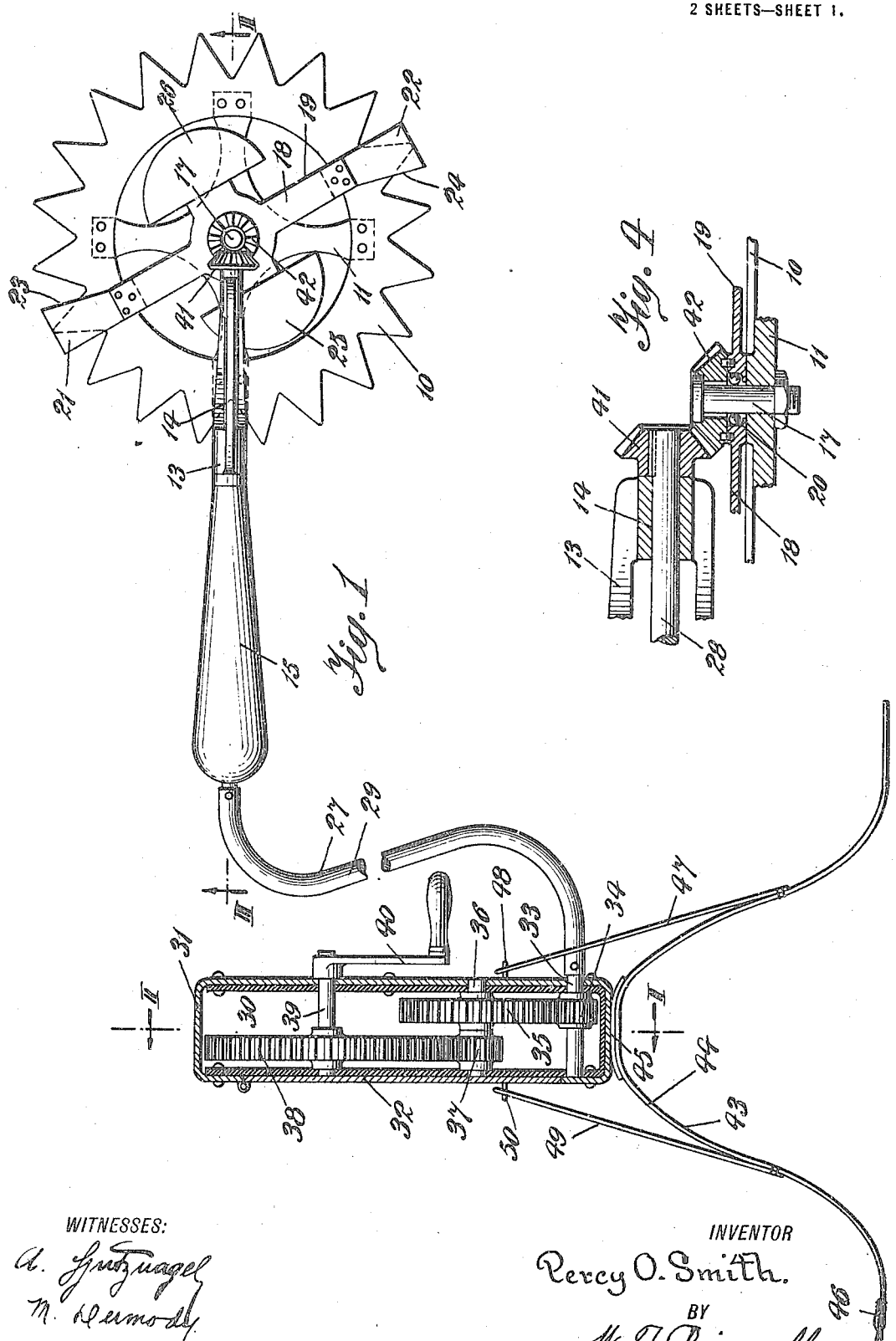

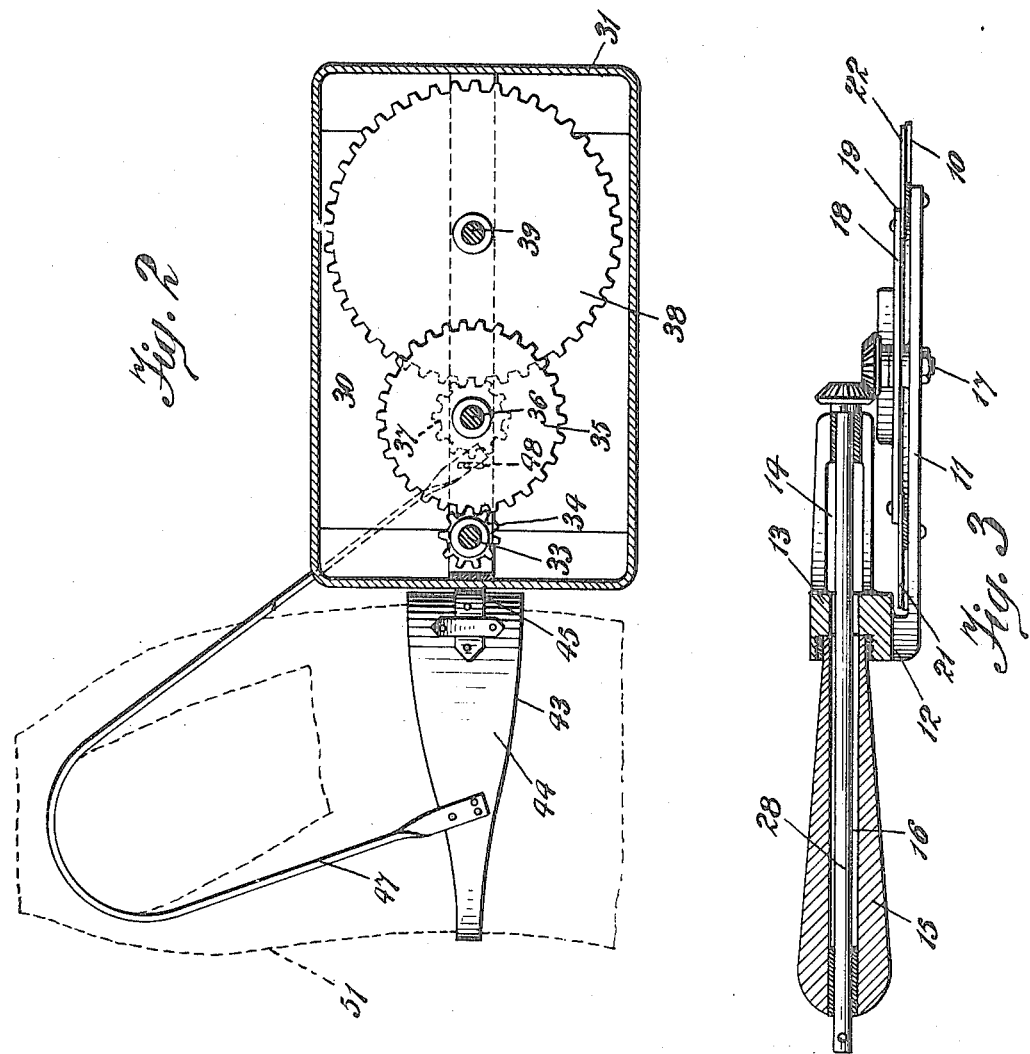

PERCY O. SMITH, OF FREEPORT, NEW YORK.

HEDGE AND GRASS CUTTER.

1,190,476.	Specification of Letters Patent.	Patented July 11, 1916.

Application filed March 13, 1915. Serial No. 14,140.

*To all whom it may concern:*

Be it known that I, PERCY O. SMITH, a citizen of the United States, and a resident of Freeport, county of Nassau, and State of New York, have invented a certain new and useful Improvement in Hedge and Grass Cutters, of which the following is a full, clear, and exact specification.

This invention relates to a class of apparatus adapted to be used in the work of keeping hedges and lawns trimmed so as to be attractive.

My invention has for its object primarily to provide a cutter whereby hedges and the grass borders especially of lawns may be evenly trimmed with facility, and which is constructed so that the apparatus may be easily carried as well as being operated by one person.

The invention consists essentially of a peripherally toothed disk held stationary on a frame having a tubular handle projecting therefrom to permit the toothed disk to be conveniently directed into contact with the hedge or the grass of lawns and the like. Mounted on the frame is a rotatable cutter in the form of a bar having on its ends two blades with oppositely disposed cutting edges which are swung in movable contact with the teeth of the disk when the bar is revolved so that the cutting blades and the teeth of the disk will coöperate for trimming the hedge, or grass, and extending laterally from opposite parts of the central portion of the cutter are two weights which are revolved in unison with the cutter for serving to add impetus to its circumferential movement, thereby causing the cutter to be driven with a minimum consumption of power as well as causing the blades to cut with unusual efficiency. The cutter is operated by a drive shaft composed of a rod which is rotatable in the passage of the tubular handle and a flexible shaft connected to this rod.

Other objects of the invention are to provide operative mechanism for driving the drive shaft; to provide means for transmitting the power from the drive shaft to the cutter; and to provide means whereby the operative mechanism may be removably applied on the body of the person operating the apparatus for being easily carried.

A practical embodiment of the invention is represented in the accompanying drawings forming a part of this specification in which similar characters of reference indicate corresponding parts in all the views, the said invention being more fully described hereinafter and then pointed out in the appended claims.

In the drawings, Figure 1 is a view, partly in detail and partly in section, looking downwardly on one form of cutter embodying my invention. Fig. 2 is a view partly in section and partly in detail taken on the line II—II of Fig. 1 showing the cutter supported on a person. Fig. 3 is a section taken on the line III—III of Fig. 1, and Fig. 4 is an enlarged sectional view taken through the parts of the apparatus used for transmitting the power from the drive shaft to the cutter.

The hedge and grass cutter has a peripherally toothed disk 10 which is preferably circular in shape, and this disk is held stationary to a frame, as 11, having an arm 12 extending slightly beyond the teeth of the disk. On the free end of the arm 12 is provided a bracket, as 13, extending toward and in proximity to the center of the disk and somewhat thereabove, and longitudinally through this bracket is a passage 14. In a threaded recess in the outer end of the bracket 13 is screwed the threaded end of a handle 15 which extends some distance beyond the stationary peripherally toothed disk 10, and lengthwise through this handle is a passage 16 which communicates with the passage 14 of the bracket 13. Fixed in an opening in the frame 11 and centrally of the toothed disk 10 is a stud, or short shaft 17 projecting some distance above the frame and above the disk.

Rotatably mounted on the shaft 17 is the central part of the bar 18 of a cutter, as 19, and between the wall of the opening and the shaft is an anti-friction bearing 20 to cause the cutter to revolve free of frictional resistance on the shaft. The bar 18 of the cutter is disposed slightly above the peripherally toothed disk 10, and on the ends of the bar are removably fastened by screws or otherwise two blades 21 and 22 with oppositely disposed cutting edges, as 23 and 24, respectively. The blades 21 and 22 of the cutter are arranged in movable contact with the disk so that the cutting edges thereof will coöperate with the teeth of the disk for trimming hedges and grass when the bar is revolved, and extending laterally from opposite parts of the central portion of the cutter are two weights 25 and 26 which are swung in the radius of a circle synchronously with the rotation of the cutter for serving to add impetus to the circumferential movement of the cutter so that it will be driven with a minimum consumption of power as well as causing the blades 21 and 22 to pass the teeth of the disk with unusual force which will cause the blades to cut with great efficiency.

The cutter 19 is rotated to coöperate with the peripherally toothed disk 10 through the medium of a drive shaft 27 which is composed of a rigid rod 28 journaled in bearings provided in the passage of the handle 15 and in the passage of the bracket 13, and this rod is of a length so that one of its ends extends beyond the bracket while its other end extends some distance beyond the handle. Detachably connected by a screw or otherwise to the end of the rod 28 projecting from the handle is one end of a flexible shaft 29 which may be of any desired type and of any suitable length.

Serving to operate the drive shaft 27 is a form of mechanism 30, Figs. 1 and 2, adapted to be detachably supported on the body of the person operating the apparatus. The mechanism 30 consists of a casing 31 which is preferably substantially rectangular in shape, and in one of the side walls of this casing is a door 32 which is hinged thereto to permit of access into the casing. Journaled in one end of the casing 31 is a shaft 33 to which the other end of the flexible shaft 27 is held, and on this shaft is a pinion 34 in mesh with a gear 35 held on a shaft 36 journaled in the casing. Also on the shaft 36 is a pinion 37 which meshes with a large gear 38 held on a shaft 39 journaled in the casing 31, and this shaft 39 is driven by a crank handle 40. When this crank handle is turned the shaft 39 and the gear 38 will be rotated, and the pinion 37, shaft 36, and gear 35 will then be also rotated. The pinion 34 and shaft 33 will thereby be revolved for driving the drive shaft 27, and in order to transmit the power from the drive shaft to the cutter 19, on the end of the rod 28 of the drive shaft 27 extending beyond the bracket 13 is a bevel gear 41 which is in mesh with a bevel gear 42 secured on the bar 18 of the cutter 19, this bevel gear also being freely revoluble on the shaft 17 of the frame 11. Thus when the drive shaft 27 is driven by the operation of the mechanism 30 rotation will be imparted to the bevel gear 41, thence to the bevel gear 42 and to the cutter 19, the weights 25 and 26 tending to increase the momentum of the cutter which in turn will be effectually operated by comparatively little propulsion of the operating mechanism.

To permit the mechanism 30 to be removably applied and supported on the body of the person operating the apparatus so that it may be easily carried and conveniently used, a belt, as 43, is provided. The belt 43 has a strap 44 which is connected, at 45, to the end of the casing of the operating mechanism 30 adjacent to the shaft 33 and the pinion 34, and this strap is adapted to be guided around the waist of the wearer after which its ends are fastened together by a buckle 46 of a suitable form which is provided on one end of the strap. To one side part of the waist strap 44 is held one end of a strap 47 adapted to be guided over the shoulder of the operator, and the other end of this shoulder strap is removably connected, at 48, to one side wall of the casing of the operating mechanism. To the opposite side part of the waist strap 44 is secured one end of another strap 49 adapted to be directed over the second shoulder of the operator, and the opposite end of this second shoulder strap is detachably fastened, at 50, to the second side wall of the casing. When the mechanism 30 is applied to a person for operating the cutter the strap 44 is guided around the operator's waist so that the casing 31 with the mechanism 30 will be positioned on the front of the wearer, and the ends of this waist strap are fastened together in the back by means of the buckle 46. The straps 47 and 49 are then guided over the shoulders of the person, as 51, and the cutter is then operated, as above described, by turning the crank handle 40, the peripherally toothed disk 10 being directed by suitably guiding the handle 15 which is held in one or both hands of the person for permitting the cutter 19 to coöperate with the teeth of the disk for trimming a hedge or the grass of a lawn and the like.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. A hedge and grass cutter, comprising a peripherally toothed disk held stationary on a frame, a handle projecting from the frame for permitting the toothed disk to be directed by a person, a rotatable bar having two cutting blades mounted on the frame so as to be revolved for the blades to coöperate with the teeth of the disk for trimming grass, an anti-friction bearing between the disk and the bar, two weights on the bar to increase its momentum when revolved, a flexible drive shaft, operative mechanism for driving the shaft, and adapted to be removably applied to the body of a person whereby the cutter may be carried, and means connected to the flexible shaft and to the bar of the cutting blades to impart rotation to this bar when the drive shaft is driven.

2. A hedge and grass cutter, comprising a peripherally toothed disk held stationary on a frame, a handle projecting from the frame for permitting the toothed disk to be directed by a person, a rotatable bar having two cutting blades mounted on the frame so as to be revolved for the blades to coöperate with the teeth of the disk for trimming grass, two weights on the bar to increase its momentum when revolved, a flexible drive shaft, operative mechanism for driving the shaft, means connected to the mechanism, and adapted to be removably applied to the body of a person whereby the cutter may be carried, and means connected to the flexible shaft and to the bar of the cutting blades to impart rotation to this bar when the drive shaft is driven.

This specification signed and witnessed this twelfth day of March A. D. 1915.

PERCY O. SMITH.

Witnesses:
 ROBT. B. ABBOTT,
 M. DERMODY.